United States Patent
Helps et al.

(10) Patent No.: US 6,250,208 B1
(45) Date of Patent: *Jun. 26, 2001

(54) TEA BREWING APPARATUS

(75) Inventors: David Helps, London; Timothy Hope Jebb, Tunbridge Wells; Charanjit Singh Nandra; Benjamin Phalan Oates, both of London; Miles Pennington, Teddington, all of (GB)

(73) Assignee: Lipton, division of Conopco, Inc., Englewood Cliffs, NJ (US)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/466,450

(22) Filed: Dec. 17, 1999

(30) Foreign Application Priority Data

Dec. 24, 1998 (GB) .................................................. 9828718
May 21, 1999 (GB) .................................................. 9911945

(51) Int. Cl.[7] ................................................ A47J 31/02
(52) U.S. Cl. .............................. 99/299; 99/303; 99/305; 99/317; 99/279
(58) Field of Search ............................ 99/299, 306, 303, 99/305, 279, 317, 318, 319, 313

(56) References Cited

U.S. PATENT DOCUMENTS

| 4,527,467 | 7/1985 | Siemensma | 99/306 X |
| 4,819,553 | 4/1989 | Heyn et al. | 99/305 |
| 6,003,435 | * 12/1999 | Patel | 99/305 X |

FOREIGN PATENT DOCUMENTS

| 3019347 | 12/1981 | (DE) . |
| 0 297 704 | 1/1989 | (EP) . |
| 0 898 917 | 3/1999 | (EP) . |
| 2282838 | 3/1976 | (FR) . |
| 2 134 376 | 8/1984 | (GB) . |
| 2 184 644 | 7/1987 | (GB) . |
| 2 207 341 | 2/1989 | (GB) . |
| 2 235 868 | 3/1991 | (GB) . |
| 04-253820 | 9/1992 | (JP) . |

* cited by examiner

Primary Examiner—Reginald L. Alexander
(74) Attorney, Agent, or Firm—James J. Farrell

(57) ABSTRACT

A machine for brewing tea, particularly in a shoc situation. The machine has a housing and at least one brewing assembly. The brewing assembly is formed to hold a brewing cup that has a filter that defines and separates a first cavity within the brewing cup for containing tea leaves and a second cavity from which tea leaves are excluded. The housing has a water supply that supplies a predetermined volume of water at a temperature that is suitable for infusing tea leaves. It also has a water supply channel for delivering the water into the first cavity of the brewing cup, and a siphon tube that has a siphoning end that extends orthogonally upward into the second cavity of the brewing cup and a downward projecting dispensing end. The apparatus is constructed in a way that tea leaves infuse as the water is supplied into the first cavity of the brewing cup, but once the level of infused tea liquor in the second cavity of the brewing cup rises above the siphoning end of the siphon tube the tea liquor siphons down the siphon tube and is dispensed from the dispensing end of the siphon tube.

8 Claims, 10 Drawing Sheets

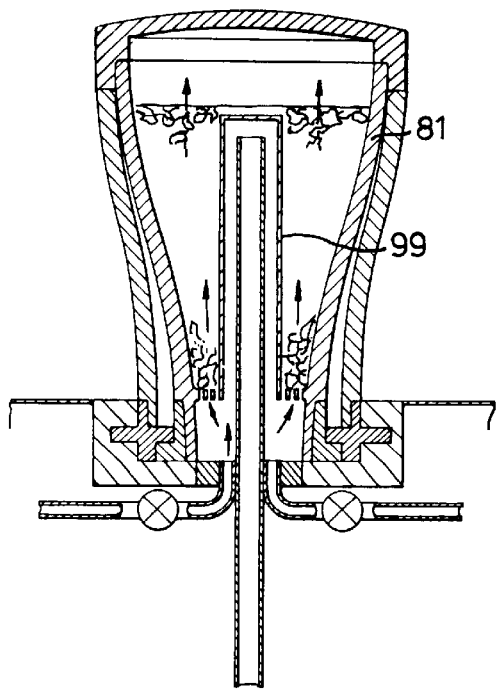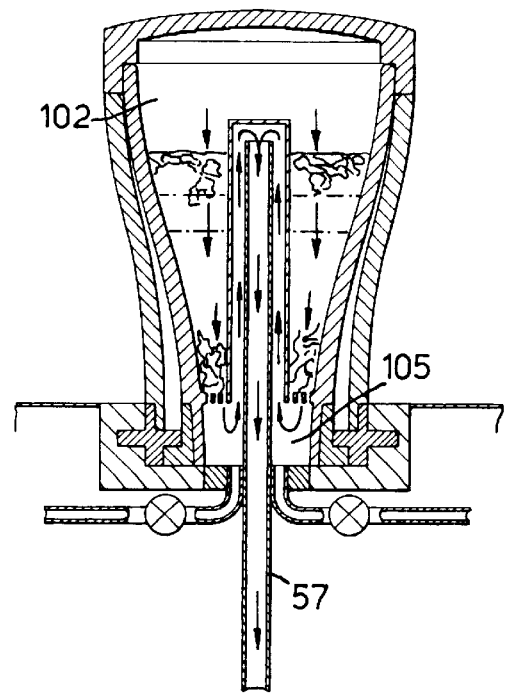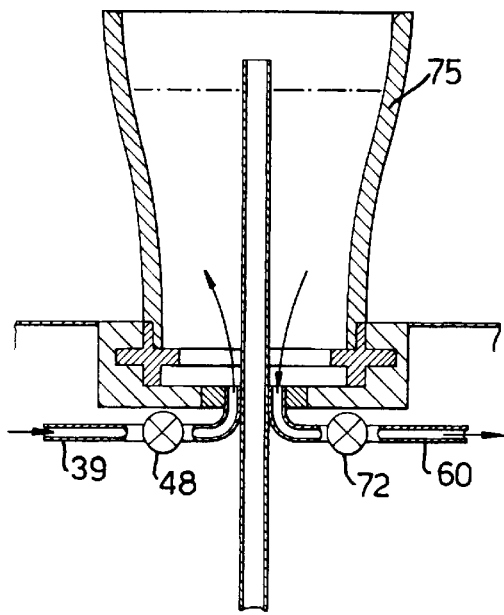

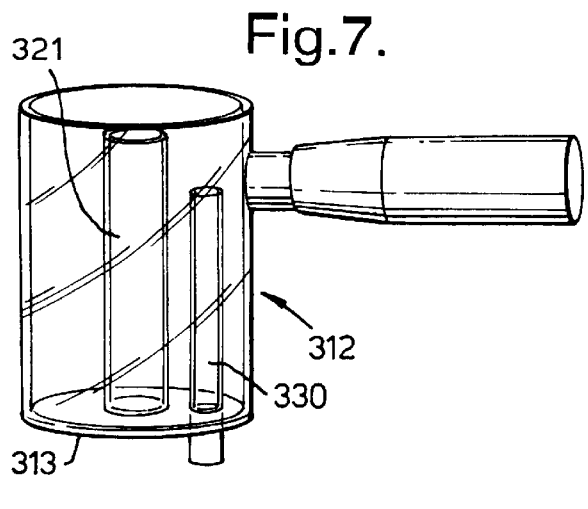
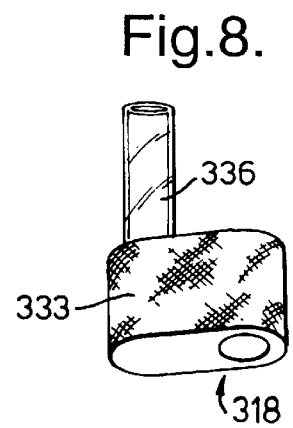
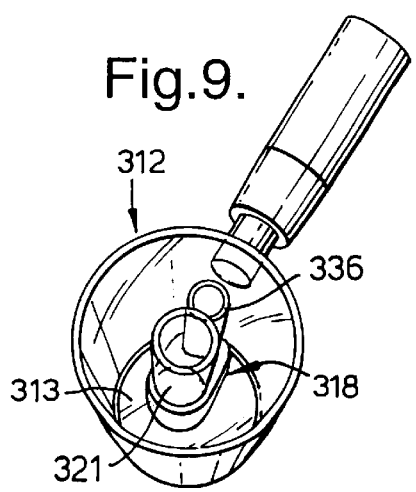
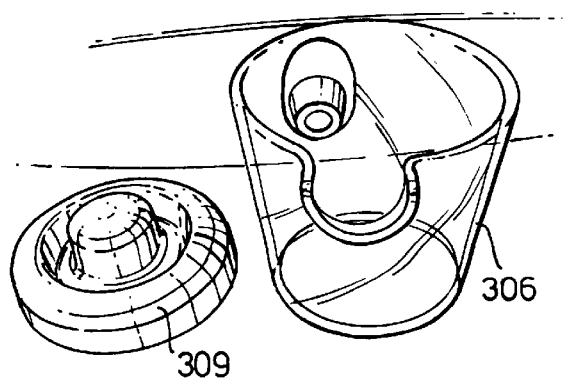
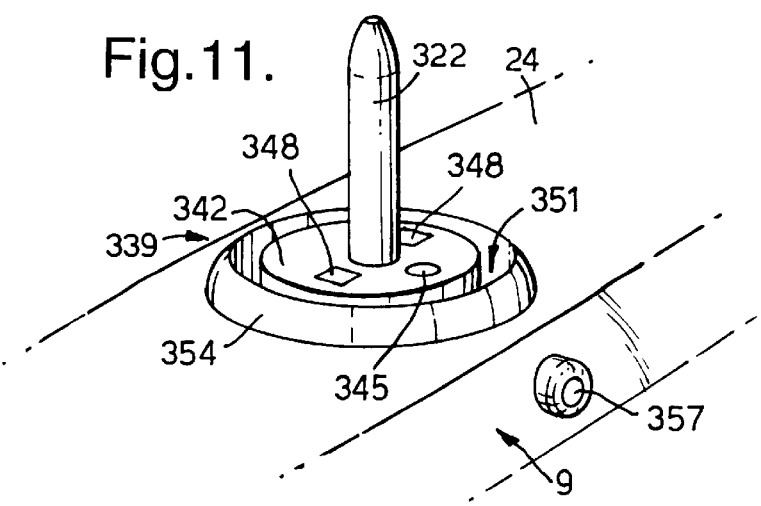

TEA BREWING APPARATUS

BACKGROUND OF THE INVENTION

1. Field of the Invention

The present invention relates to an apparatus for brewing infusible plant substances, especially tea.

With the exception of water, tea is the most widely consumed of all beverages. Its world-wide per capita consumption has been estimated at 0.1 litre per day. In western countries tea tends to be brewed at home, however, there is a growing trend for consumers to consume tea out of home in cafes and bars. It is thought that consumers prefer to enjoy a tea experience that involves more than being supplied with a tea bag and hot water. There is therefore a need for an alternative brewing method.

Coffee brewing equipment is a familiar feature of cafes and bars. Tea is however much more sensitive to brewing than coffee. Extended steeping in water often ruins the beverage. Too short a steeping time results in too diluted a drink.

2. Description of Related Art including Information Disclosed under 37 CFR 1.97 and 1.98

Commercial tea brewing machines are known too. For examole European patent specification EP 898917 (Unilever) discloses an apparatus for brewing tea that has a housing with a water inlet channel, a heater to heat the water delivered through the channel and a water dispenser within the housing for providing a spray of hot water to a brewing pot. The housing includes a filter receotacle that can contain a filter basket of wire mesh or fluted filter paper. The apparatus has a siphoning mechanism that has been constructed so that the function of the apparatus is unimpaired by tea particle interference in the brewing mechanism. The apparatus is designed to allow for tea to steep in its optimal range of from 3 to 5 minutes. The showering action is central to achieving that.

Such an apparatus has proved successful in preparing batches of freshly brewed hot tea however it is not suited to providing individual servings in quick succession as is required in a busy tea shop. When the filter basket is made of wire mesh it can be difficult to quickly clean it thoroughly enough between brews. When the filter basket is made of fluted filter paper it can become costly to replace it each time, time consuming tho fit and fill it, and inconvenient to dispose a large number of them.

United Kingdom patent specification GB 2184644 (W. M. Still & Sons) similarly discloses a tea making apparatus that involves showering hot water over a bed of leaves. Means are provided for delaying the passage of the heated water through the tea leaves to allow for a good extraction. Once that is achieved the tea is dispensed by a siphoning action. U.S. Pat. No. 4,527,467 (Phillios) discloses another filter device. Tea leaves placed in a bowl having an outlet aperture formed in its bottom for discharge of brewed tea. An outlet tube communicates with the outlet aperture and extends upwardly from the bottom of the bowl. A sleeve surrounds the outlet tube with a space between them providing an annular siphon passageway. The upper end of the sleeve is closed while the lower end rests on the bowl bottom. Capillary inlet apertures are formed in the lower portion of the sleeve. As the liquid therefore falls in the bowl, the static pressure of the liquid retained in the annular siphon passageway is balanced by the capillary pressure of the retained liquid and the capillary inlet apertures. Passage of airway bubbles through the capillary inlet apertures is thereby prevented. Upon addition of further liquid to the bowl, the siphoning operation immediately resumes.

While the siphon arrangement in U.S. Pat. No. 4,527,467 advanced the art, it is still subject to certain problems. Tea placed within the bowl for brewing can migrate to the capillary. Particles of tea can then preclude the capillary inlet apertures and interfere with siphoning. Sometimes relatively small particles can be slipped through the capillary inlets with eventual siphoning into the consumer's brew. These particles in the brewing product are aesthetically and tastewise very undesirable.

Accordingly, it is an object of the present invention to provide a tea brewing apparatus that is suitable for providing individual servings of high quality freshly brewed tea in a busy shop situation.

It is an alternative and more general object of the present invention to provide a brewing machine suitable for brewing tea that is at least a useful alternative to those currently available.

BRIEF SUMMARY OF THE INVENTION

In broad terms the present invention relates to a tea brewing machine comprising a housing and at least one brewing assembly; said brewing assembly is adapted to receive a brewing cup that includes a filter that defines and separates a first cavity within said brewing cup for containing tea leaves and a second cavity within said brewing cup from which tea leaves are excluded; said housing has water supply means for supplying a predetermined volume of water at a temperature that is suitable for infusing tea leaves, a water supply channel for delivering said water into said first cavity of said brewing cup, and a siphon tube that has a siphoning end that extends orthogonally upward into said second cavity of said brewing cup and a downward projecting dispensing end; the arrangement being such that said tea leaves infuse as said water is supplied into said first cavity of said brewing cup, but once the level of infused tea liquor in the second cavity of said brewing cup rises above the siphoning end of the siphon tube said tea liquor siphons down the siphon tube and is dispensed from the dispensing end of the siphon tube.

Preferably the brewing assembly includes means for heating the contents of the brewing cup to increase the rate of infusion and the water supply means supplies a selection of predetermined volumes of water to accommodate different serving sizes.

Preferably the tea brewing apparatus has a plurality of mutually independent brewing assemblies.

"Tea" for the purposes invention means leaf material from *Camellia sinensis var. sinensis* or *Camellia sinensis var. assanica*. It also includes rooibos obtained from *Aspalathus linearis*. "Tea" is also intended to include the product of blending two or more of any of these teas.

For the avoidance of doubt, the word "comprising" is intended to mean including but not necessarily "consisting of" or "composed of". In other words, the listed options or steps need not be exhaustive.

All numbers in this description indicating amounts or temperatures of material ought to be understood as modified by the word "about".

DETAILED DESCRIPTION OF THE INVENTION

The present invention concerns an apparatus for brewing tea. The apparatus is particularly suited for commercial use in an out-of-home situation but it need not be used exclusively for that purpose.

Three preferred embodiments of the invention will now be described with reference to the accompanying drawings.

BRIEF DESCRIPTION OF THE SEVERAL VIEWS OF THE DRAWINGS

In the drawings:

FIGS. 3a through 3g show the same vertical section through the brewing assembly view of the first preferred embodiment at different stages of the brewing process.

FIG. 7 is a side view of the brewing cup of the brewing assembly shown in FIG. 6.

FIG. 8 is a perspective view of fine filter body of the brewing assembly shown in FIG. 6.

FIG. 9 is a clan view of the brewing cup of the brewing assembly shown in FIG. 6 with the filter body in place.

FIG. 10 is a perspective view of the filter cup receptacle and its lid.

FIG. 11 is a front view of the assembly base of the brewing assembly seat shown in FIG. 6.

Figure 1:
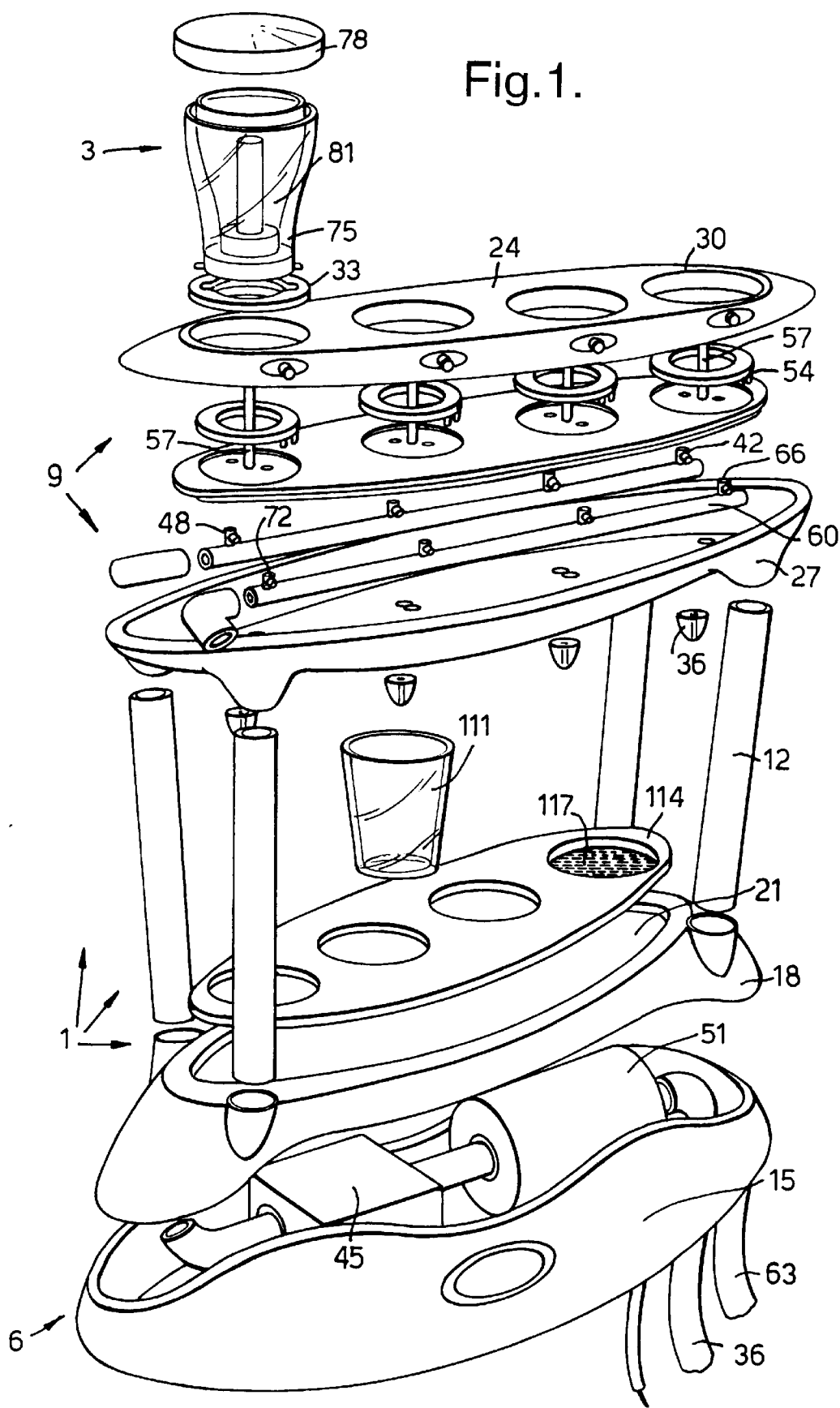
FIG. 1 is an exploded view of the first preferred embodiment of the brewing apparatus of the present invention.

The first preferred embodiment of the brewing apparatus, best shown in an exploded view in FIG. 1, has a housing 1 and sour brewing assemblies 3. The housing 1 comprises a base 6 and an upper platform 9 connected by four support/delivery pipes 12. The base 6 comprises a lower base portion 15 and an upper base portion 18 that are fixed together. The upper base portion 18 incorporates a drip tray 21. The upper platform 9 comprises an upper platform top 24 and an upper platform bottom 27, which are fixed together. Four recesses 30 are formed in the upper platform top 24 in which fit four outer guard bayonet collars 33. A brewing assembly 3 is detachably mounted to each of the respective outer guard bayonet collars 33.

The lower base portion 15 of the housing 1 has a water inlet 36 that connects to a water supply channel 39. The water supply channel 39 extends from the water inlet 5 through the base 6, up though one of the support/delivery pipes 12, through the upper platform bottom 27 then splits into four fresh water channel branches 42 terminating at the respective outer guard bayonet collars 33. This channel 39 supplies fresh water to the brewing assemblies 3. One could alternatively use an arrangement that connects the brewing assemblies in parallel. A pump 45 is provided in the base 6 to drive the water upwards. Inlet valves 48 are provided in the branches 42, adjacent the cuter guard bayonet collars 33, to provide means for finely controlling the supply of fresh water to the respective brewing assemblies 3.

The water that is supplied to the brewing assemblies must be of a temperature that is suitable for infusing tea. That is generally between 70 and 100° C. but preferably between 90 and 100° C. If necessary, the water can be softened, for example by treating it to remove calcium, in order to minimise scaling. One could supply freshly boiled water to the brewing apparatus or supply cold water and provide means within the apparatus to heat the water to the required temperature. However in the first preferred embodiment the water is supplied at a temperature of between 80 and 90° C. and a flash heater 51 is connected to the water supply channel 39 in the base 6 of the housing 1 to raise the temperature to the optimum brewing temperature of between 90 and 100° C. A heating ring 54 is provided alongside the underside of each of the outer guard bayonet collars 33 to avoid the water temperature dropping as the water enters the brewing assemblies 3.

A siphon tube 57 passes through each of the outer guard bayonet collars 33. This tube is open at both ends. One end protrudes out of the upper platform top 24 and into the brewing assembly 3. The other connects with a nozzle 36 that is attached to the under surface of the upper platform bottom 27. The function of this tube will become clear when describing the form and function of the brewing assembly.

The water supply chances 39 and its function have been described above. A rinse water channel 60 ins provided in he housing 1 to remove water that is used to rinse the brewing assembly 3. This channel 39 extends from a rinse water outlet 63 in the lower base portion 15 of the housing, up through one of the support/delivery pipes 12, through the upper platform bottom 27 then splits into four rinse water channel branches 56 terminating at the respective outer guard bayonet collars 33. An aperture 69 is formed in the floor of each of the cuter guard bayonet collars 33 which allows rinse water to flow from the respective brewing assemblies 3 down through the rinse water channel 60. The water will flow down by force of gravity however outlet valves 72 are provided in the branches 66, adjacent the outer guard bayonet collars 33, to provide means for finely controlling the disposal of rinse water from the brewing assemblies 3.

Figure 2:
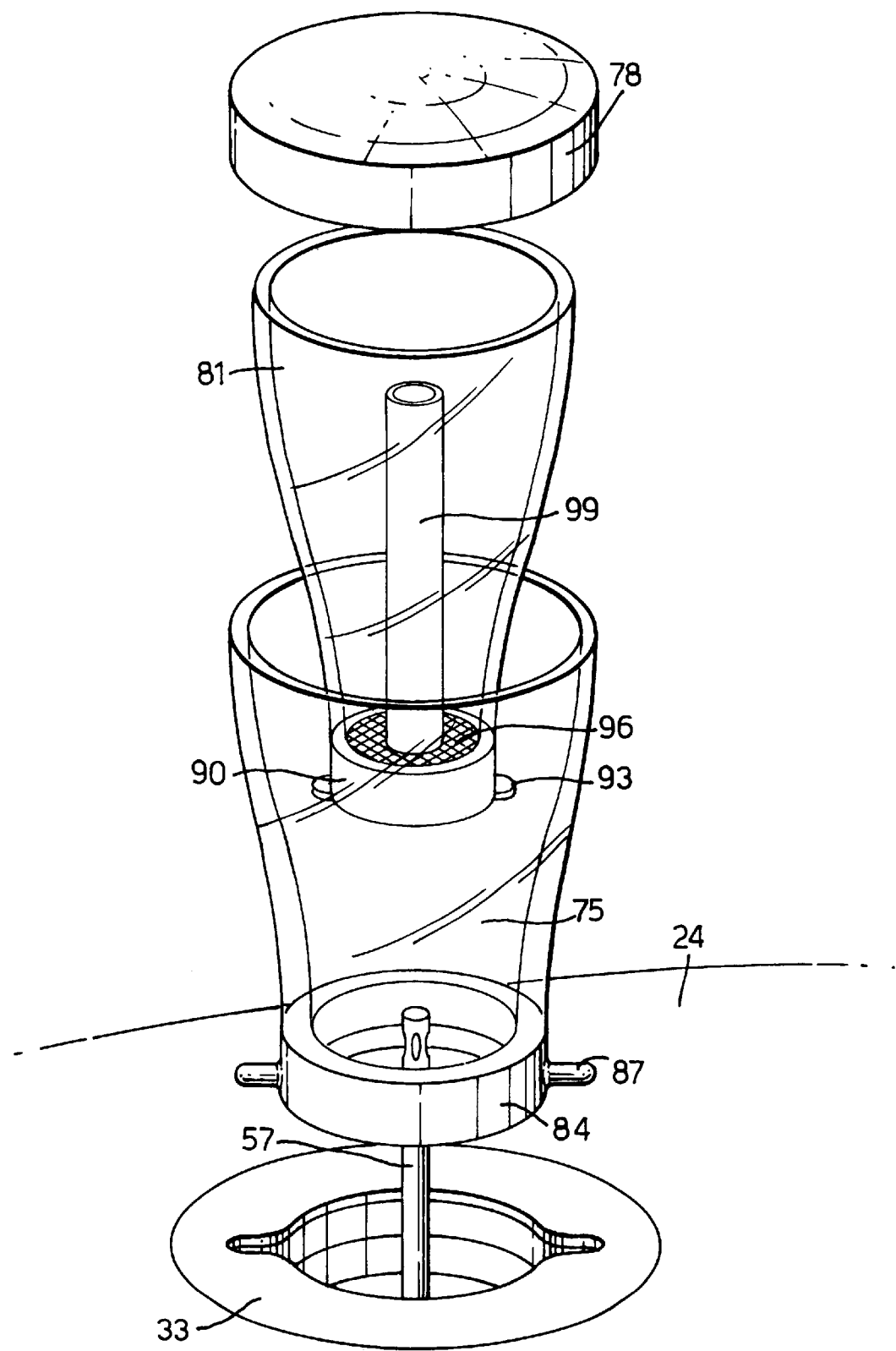
FIG. 2 is an exploded view of the brewing assembly of the brewing apparatus shown in FIG. 1.

The brewing assemblies 3 themselves will now be described in detail. One of the four identical brewing assemblies 3 is shown in FIG. 1, in more detail in FIG. 2 and in cross-section in FIG. 3a. The brewing assembly 3 comprises a filter receptacle 75, a lid 78 for same and a filter cup 81. The filter receptacle 75 resembles a bottomless glass with an annular base portion 84. The base portion 84, which is preferably metallic, has a pair of bayonet limbs 87. These bayonet limbs 87 allow the base portion 84 of the filter receptacle 75 to be removably secured to the upper platform top 24 of the housing 1 by engaging with the complementarily formed outer guard bayonet collar 33. The filter cup 81 also resembles a bottomless glass having an annular base. The filter cup base 90 has a pair of bayonet limbs 93 too. These are for removably nesting the filter cup 81 within the filter receptacle 75. The filter cup 81 has a porous floor 96 from which a non-porous siphon shroud 99 projects orthogonally upwards. The siphon shroud 99 is shaped so that it more than comfortably accommodates the siphon tube 57 that extends out of the upper platform too 24 of the housing 1.

Figure 3A:
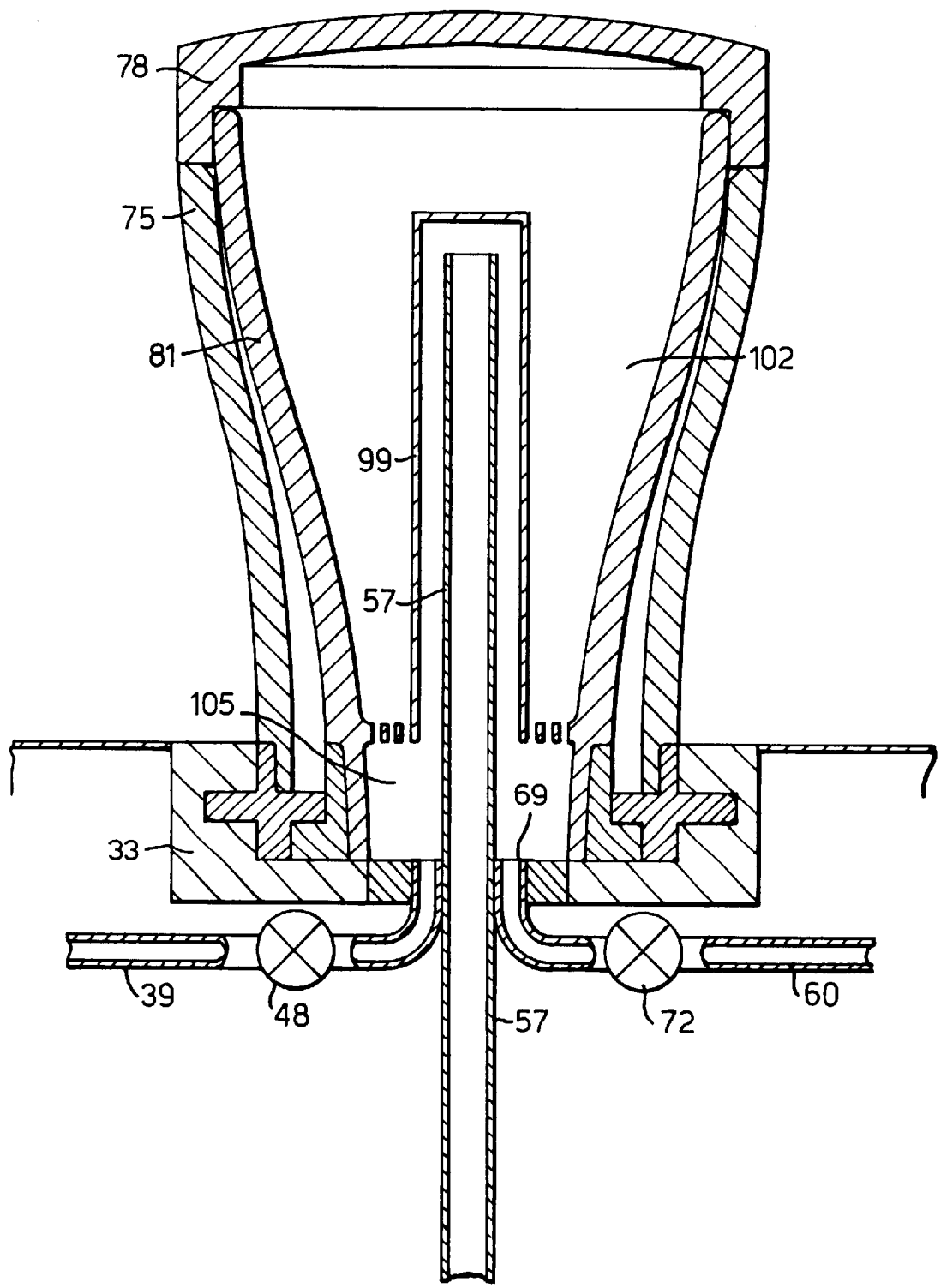

An upper filter cup cavity 102 is formed between the lid 78, the inner surface of he surrounding walls of the filter cup and the corous floor 96 of the filter cup 81. This is best seen in FIG. 3a. A lower filter cup cavity 105 is formed between the inner surface of the surrounding walls of the filter cup 81 below the porous floor 96 of the filter cup, the porous floor itself, the floor of the outer guard bayonet collar 33, and the inner surface of the siphon shroud 99. This again is best seen in FIG. 3a. One end of the siphon tube 57 extends into this cavity 105.

The water supply channel 39 and the rinse water channel 60 communicate with the lower filter cup cavity 105 and also, by virtue of the oorous filter cup floor 96, with the upper filter cup cavity 102. The flow of water through these channels being controlled by the aforementioned inlet and outlet valves (48, 72). During use tea leaves 108 are infused in the upper filter cup cavity 102. The porous floor 96 of the filter cup 81 prevents the leaves from entering the lower filter cup cavity 105.

As mentioned previously, one end of the siphon tube 57 terminates with a nozzle 36. The tea liquor leaves the housing at this point and is collected in a serving receptacle 111 that can be located on a drip plate 114. The drip plate 114 sits in the drip tray 21 incorporated in the upper base portion 18 of the housing. It can be sloped to facilitate draining. The drip plate 114 has perforated circular recessed areas 117 that have a diameter that corresponds to that of the bottom of the serving receptacle 111. Any drips that leave the nozzle 36 when there is no serving receptacle 111 below pass through the perforated recessed areas 117 into the drip tray 21. A drip pipe (not shown) is provided in the drip tray 21 that communicates with the rinse water channel 60. In that way the drips leave the housing by the rinse water outlet 63.

The operation of the first preferred embodiment of the invention will now be described with reference to FIGS. 3b through 3g.

Figure 3B:
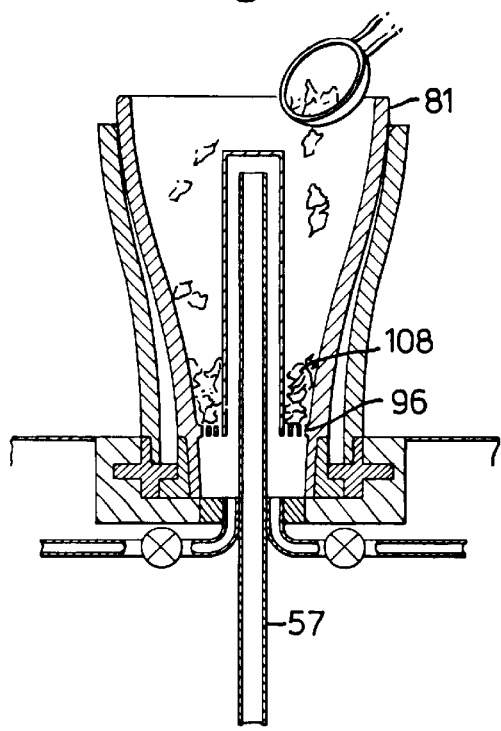

FIG. 3b: Tea leaves 108 are loaded and dosed Into the filter cup 81 using a spoon or some other suitable dosing means. The leaves will collect in the filter cup 81 but will not pass through the perforations formed in the porous floor 96 of the filter cup .

Figure 3C:
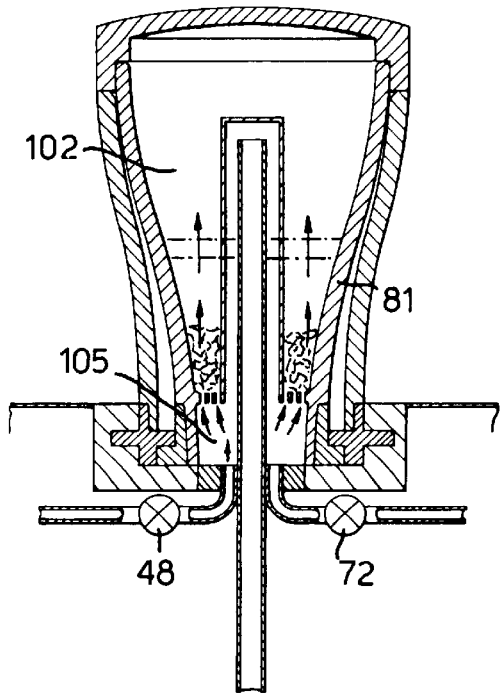

FIG. 3c: Water that has reached a suitable temperature for brewing is pumped into the filter cup 81. The volume supplied is controlled by the inlet valve 48. The rinse water outlet valve 72 is already closed and thus the level of hot water will simply rise in the filter cup 81.

Figure 3D:
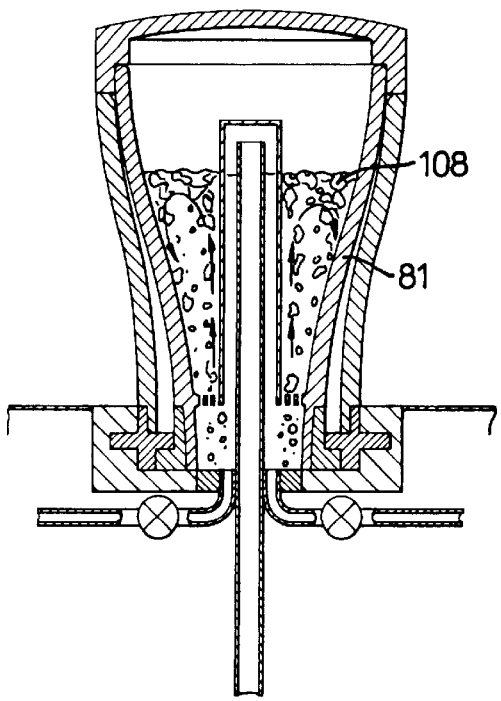

FIG. 3d: The tea leaves 108 infuse as the volume of water increases in the filter cup 81. The filling action forms eddies in the rising water. This swirling facilitates the infusion of the tea leaves.

FIG. 3e: More hot water is pumped into the filter cup 81. Eventually the water level arises above the siphon shroud 99.

FIG. 3f: When that occurs the infused tea liquor will begin to be siphoned from the upper filter cup cavity 102 into the lower filter cup cavity 105, flow into and down the siphon tube 57, and out of the housing through the nozzle 36 into a serving receptacle 111 placed on the drip plate 114 (See FIG. 1) thereunder.

FIG. 3g: Once the liquid contents of the filter cup 81 have been removed the filter cup can be removed from the filter receptacle 75 and the spent leaves 108 discarded. With the filter cup 81 removed the water inlet valve 48 can be opened to allow hot water into the filter receptacle 75. The water level will rise in the filter receptacle 75. The volume provided should be less than that required for the water level to rise above the end of the siphon tube (unless the siphon tube requires rinsing). An that way, when the outlet valve 72 is opened the hot water will rinse the filter receptacle 75 and pass out of the brewing assembly 3 down the rinse water channel 60 and out of the housing 1 through the rinse water outlet 63. The brewing assembly 3 would now be ready for another use. The used filter cup can be replaced by a clean filter cup 81 and the process repeated.

Figure 4:
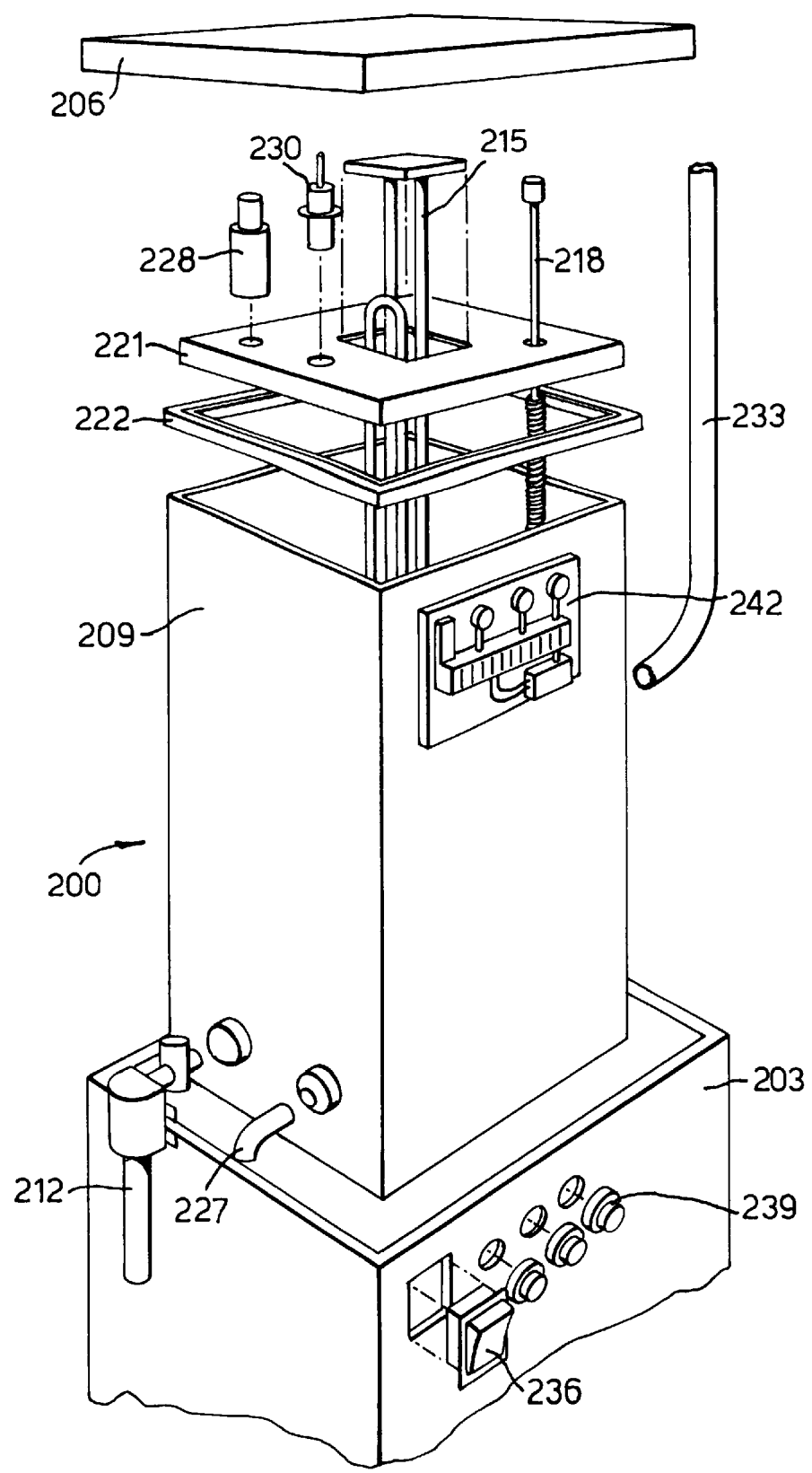
FIG. 4 is an exploded view of a base unit that is attached to the brewing apparatus shown in FIG. 1.

The aforementioned brewing apparatus is designed to be placed on a counter or bench or the like. While this could be a stand-alone unit, both the first and second preferred embodiments of the invention are used in association with a boiler unit. This boiler unit is shown in FIG. 4.

The boiler unit 200 has an outer case 203 and a lid 206. The unit 200 houses a hot water tank 209. Water enters the hot waver tank 209 via a water inlet tube 212. The water is heated by an immersion heater 215 to a temperature that is close to that required for brewing tea, preferably 80–90° C. The temperature of the water within the water tank 209 is maintained at the desired temperature within that range by a thermostat 218. The water tank has a water tank lid 221 that is connected to the hot water tank 209 via a gasket 222. A float switch 228 and a level meter 230 are included in the water tank lid 221.

Hot water from the tank 209 is drawn up to the water inlet of the brewing apparatus (water inlet 36 in FIG. 1) through a hot water outlet tube 233. The contents of the water tank can be drained through a draining tap 227. A mains switch 236 and adjustment controls 239 are formed in the outer case 203 of the boiler unit 200. The adjustment controls are connected to a main circuit board 242 which are in turn connected to the level meter 230 and the float switch 228, the immersion heater 215 and the thermostat 218.

The second preferred embodiment of the brewing apparatus of the invention will now be described.

The second preferred embodiment comprises many of the features of the first preferred embodiment. The embodiments differ in the construction and to some extent the operation of the brewing assemblies.

Figure 5:
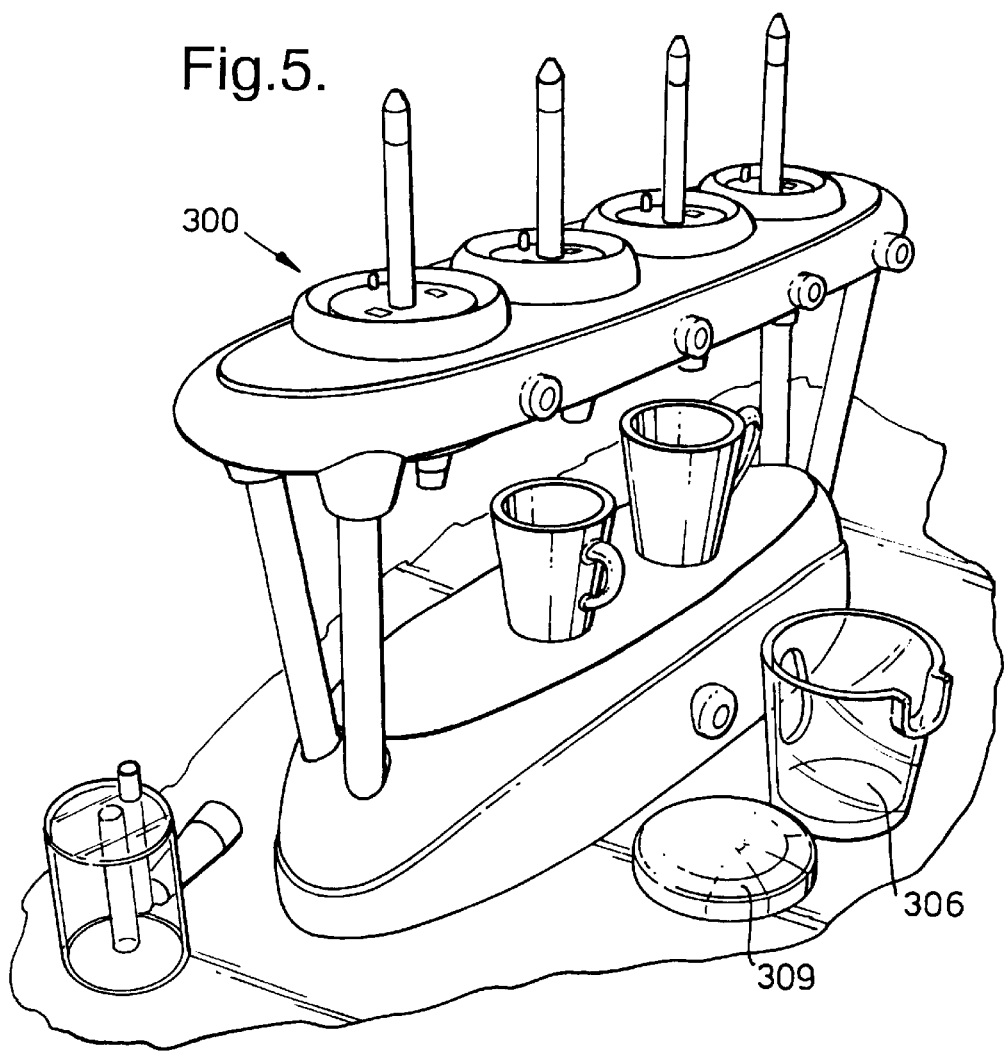
FIG. 5 is a perspective view of the second preferred embodiment of the brewing apparatus of the present invention.
Figure 6:
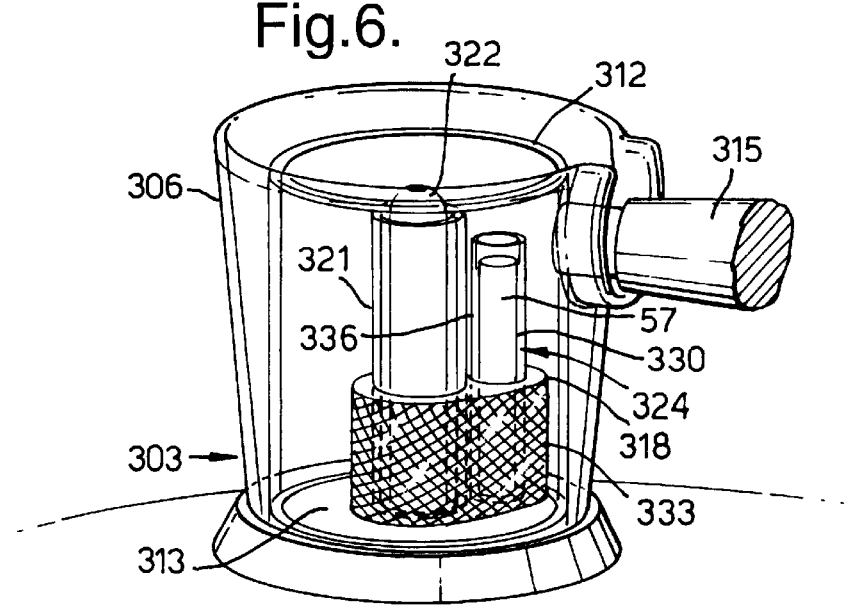
FIG. 6 is a perspective view of a brewing assembly of the brewing apparatus shown in FIG. 5.

The second preferred embodiment 300 is depicted in FIG. 5. One of the four identical brewing assemblies 303 is illustrated in FIG. 6. Various constituent parts are shown in FIGS. 7 through 10.

Each brewing assembly 303 comprises a brewing cup receptacle 306 having a lid 309 (not shown in FIG. 6), a brewing cup 312 having a base 313, a handle 315 and a filter body 318. The top edge of the brewing cup receptacle 306 is formed to accommodate the handle 315 of the brewing cup 312 when the brewing cup receptacle lid 309 is in place.

Two brewing cup tubes (321,324) pass through the base of the brewing cup 312.

The first brewing cup tube 321 projects upward from the centre of the base 313 of the brewing cup 312 and terminates short of the mouth of the cup. The tube 321 is adapted to snugly accommodate a water supply tube 322 which is connected to the water supply channel 39 (not shown in FIGS. 5 or 6) and supplies water to the brewing assembly 303. An o-ring is preferably provided on the water supply tube 322 to sea the gap between it and the tube 321.

The second brewing cup tube 324 passes through, the base 313 of the brewing cup 312 and is essentially a detachable portion of the siphon tube 57. Best seen in FIG. 7, the second brewing cup tube 324 has a first portion 327 that extends below the base 313 of the brewing cup and a second portion 330 that projects upward from the base 313 within the brewing cup 312 and is substantially parallel to the first brewing cup tube 321. The first portion 327 of the second brewing cup tube 324 is preferably jacketed with metal tubing as in use it is prone to be damaged. It is shorter than the second portion 330 of the second brewing cup tube 324 for reasons that will become clear.

The filter body 318 comprises a cylindrical filter 333 that is adapted to nest over the first and second brewing cup tubes (321 and 324). A siphon shroud 336 extends from the filter body 318 and is adapted to fit over the second portion 330 of the second brewing cup tube 324.

The second referred embodiment of the brewing acoaratus of the invention differs from the first preferred embodiment in the manner in which the brewing assembly is attachable to the upper platform top 24 of the upper platform 9. Instead of the bayonet arrangement the upper platform top has four brewing assembly seats 339, one of which is illustrated in FIG. 11.

The assembly seat 339 has a brewing assembly platform 342 on which the brewing cup 312 sits. The water supply tube 322 projects upward from the centre of the platform 342. The platform 342 has an aperture 345 that is adapted to receive the metal jacketed first portion 327 of the second brewing cup tube 324 of the brewing cup 312. The aperture 345 defines he opening of siphon tube 57; or rather the non-detachable part thereof. The platform also has a pair of heating plates 348 whose function will become clear later. The seat has an annular recess 351 that is formed between the platform 342 and an annular lip 354. The recess 351 accommodates the bottom of the brewing cup receptacle 306. Microswitches can be suitably provided to disable the heating plates and/or to prevent water being pumped out through the tube 321 when a brewing cup is not in place. Grub screws or the like can be used to keep the brewing cup receptacle 306 in place.

A button 357 is located in the upper platform top adjacent each brewing assembly seat 339 which is depressed to activate the brewing process. Of course the button 357 could be located elsewhere if desired. That may be wise if the construction is such that the area around the brewing assembly seat 339 becomes hot.

The brewing apparatus can be programmed to deliver various volumes of tea for various serving receptacles. When customers are to be presented with a serving choice the brewing apparatus is preferably provided with a button 357 for each choice and the apparatus is programmed accordingly.

The operation of the second preferred embodiment of the invention will now be described.

The filter body 318 is placed in the brewing cup 312 and the brewing cup is placed on the brewing assembly platform 342 within the brewing cup receptacle 306. Tea leaves are loaded and dosed into the brewing cup using a spoon or some other suitable dosing means. The leaves cannot pass through the filter body 318.

The user or operator depresses the button 357 adjacent the relevant brewing assembly 303 to activate the brewing process.

Water that has reached a suitable temperature for brewing is pumped into the brewing cup 312 via the water supply tube 322. The inlet valve 48 controls the volume supplied. The rinse water outlet valve 72 is already closed and thus the level of hot water will simply rise in the brewing cup.

The tea leaves infuse as the volume of water increases in the brewing cup. The filling action causes the tea leaves to swirl in the brewing cup. The heating plates 348, that are also activated when the button 357 is depressed, create convention currents or eddies in he water to facilitate the swirling infusion of the tea leaves.

The inlet valve 28 is programmed to allow the water level to rise just short of he exposed end of the second brewing cup tube 324 i.e. the detachable portion of tne siphon tube 57. The tea leaves are left to infuse in that volume of water for a predetermined optimum brewing time. That time might be varied to accommodate different blends of tea.

Once the tea has brewed, the inlet valve 28 is programmed to open to pump a predetermined volume of additional hot water into the brewing cup. The water level shortly rises above the exposed end of the second brewing cup tube 324. When that occurs the infused tea liquor in the brewing cup will begin to be siphoned through the filter body 333 and up and into second brewing cup tube 324, down the siphon tube 57 and out of the nozzle 36 into a serving receptacle 111 that has been placed on the drip plate 114 (See FIG. 5) thereunder.

Once the liquid contents of the brewing cup 312 has been removed the brewing cup can be removed from the brewing cup receptacle 306 and the spent leaves 108 discarded.

The used brewing cup can be rinsed clean or replaced by an unused brewing cup and the process repeated.

The third preferred embodiment of tne brewing apparatus of the Invention will now be described.

The third preferred embodiment comprises most of the features of the second preferred embodiment. The embodiments differ predominantly in the construction and to some extent the operation of the brewing assemblies. However the inlet valves 48 and outlet valves 72 that were located within the upper platform 9 of the brewing apparatus of the first preferred embodiment have been relocated into the boiler unit 200 where they are less likely to be exposed to high temperatures that can affect tne performance.

Figure 12:
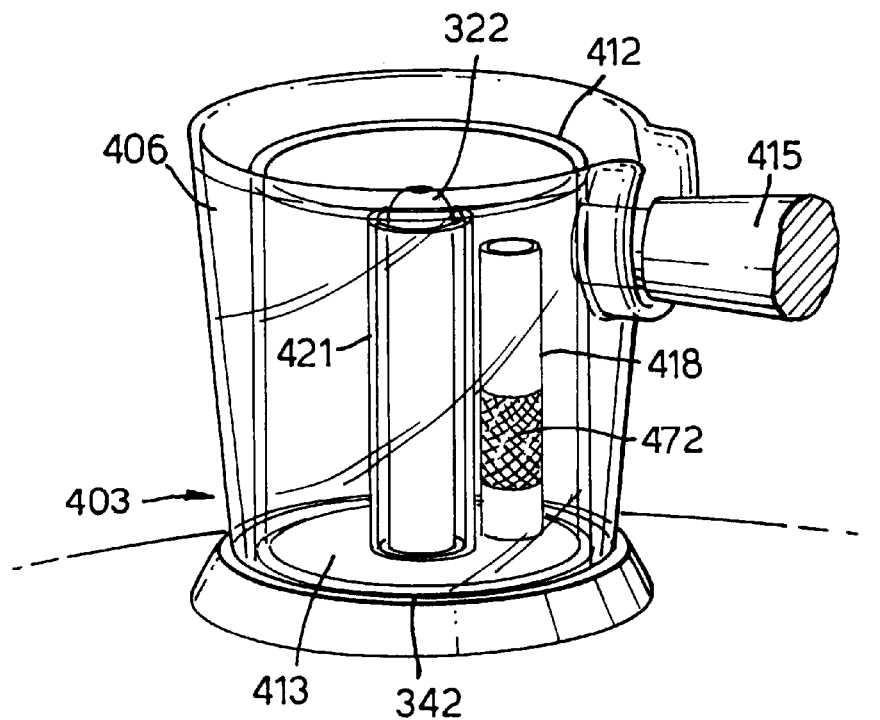
FIG. 12 is a perspective view of a brewing assembly of the third preferred embodiment of the brewing apparatus of the present invention.
Figure 13:
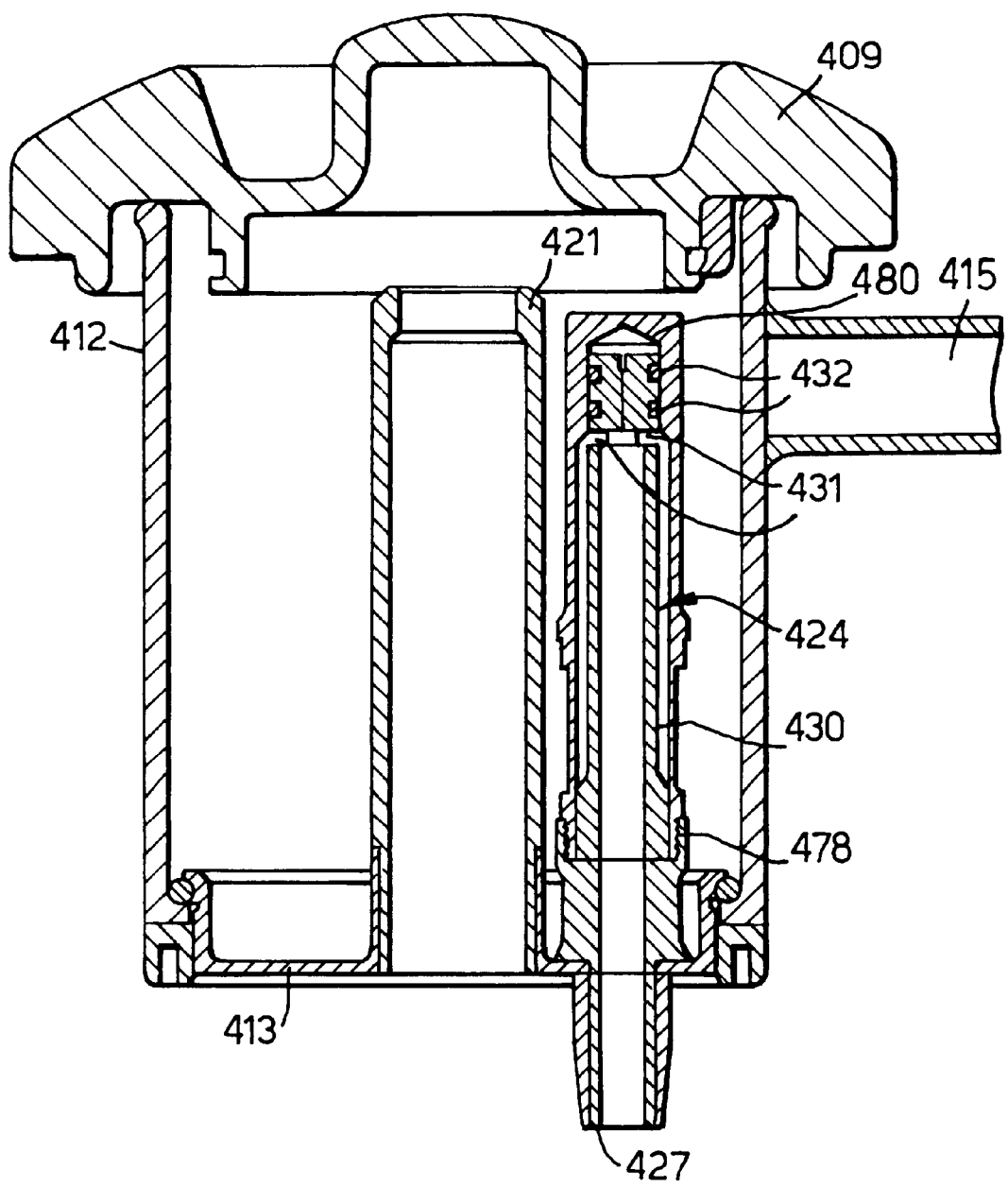
FIG. 13 is a vertical cross-section of the brewing cup shown in FIG. 12.

One of the four identical brewing assemblies 403 of the third preferred embodiment is illustrated in FIG. 12. Each brewing assembly 403 comprises a brewing cup receptacle 406 having a lid (not shown in FIG. 12), a brewing cup 412 having a handle 415 and a filter member 418. FIG. 13 is a vertical cross-section of the brewing cup 412, its lid 409, the handle 415 and the filter member 418.

Two brewing cup tubes (421,424) pass through the base 413 of the brewing cup 412.

The first brewing cup tube 421 projects upward from the centre of the base 413 of the brewing cup 412 and terminates short of the mouth of the cup. The tube 421 is adapted to snugly accommodate a water supply tube 322 which is connected to the water supply channel 39 (not shown in FIGS. 12 or 13) and supplies water to the brewing assembly 403. An o-ring is preferably provided on the water supply tube 322 to seal the gap between it and the tube 421.

The second brewing cup tube 424 passes through the base 413 of the brewing cup 412 and is essentially a detachable portion of the siphon tube 57.

Best seen in FIG. 13, the second brewing cup tube 424 has a first portion 427 that extends below the base 413 of the brewing cup and a second portion 430 that projects upward from the base 413 within the brewing cup 412 and is substantial parrel to the first brewing cup tube 421.

The first portion 427 of the second brewing cut tube 324 is preferably jacketed with metal tubing as in use it is prone to be damaged. It is shorter than the second portion 430 of the second brewing cup tube 424 for reasons that will become clear.

The distal end of he second portion 430 of the second brewing cup tube 424 (i.e. the end which points away from the base 413 of the brewing cup 412) is closed. Apertures 431 are formed adjacent the distal end of the second portion 430 of the second brewing cup tube 424. The purpose of these apertures will be explained below. A pair of o-rings 432 are provided adjacent the distal end of the second portion 430 of the second brewing cup tube 424 for a reason that will also be explained below.

Figure 14:
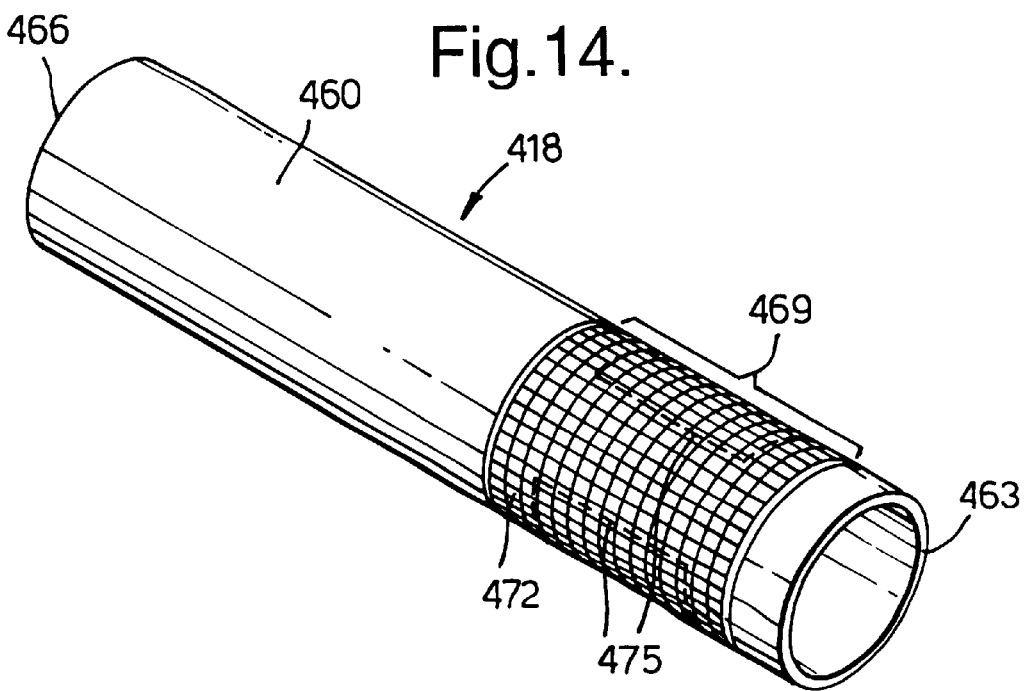
FIG. 14 is a perspective view of the filter member shown in FIG. 12.

Best seen in FIGS. 13 and 14, the filter member 418 comprises a tube 460 having an open end 463 and a closed end 466. The filter member 413 is preferably made of metal in order to withstand the heat that can be generated in the brewing process. The tube 460 has a waist portion 469 that is adapted to receive a filter tube 472. The filter tube 472 is preferably made of a resilient metal mesh that can be slipped on to the tube 460 and snugly fit in the waist portion 469. Slots 475 are formed in the waist portion 469 of the tube 460. It is through these slots that infused tea is siphoned.

The filter member 418 is adapted to fit over the second portion 430 of the second brewing cup tube 424. The fit is a generous one width-wise as infused tea will need to be able to pass between them. The filter member 418 preferably includes means for detachably securing the filter member to the brewing cup. In the present embodiment the open end 463 of the tube 460 of the filter member is push fitted onto a threaded collar 478 that is screwed to the second brewing cup tube 424. The closed end 463 of the filter member 413 includes a recess 480 to receive the distal end of the second portion 430 of the second brewing cup tube 424. The o-rings 432 that are provided adjacent the distal end of the second portion 430 of the second brewing cup tube 324 ensure a water proof fit is obtained. The recess 480 however is formed so as to direct infused tea into the second portion 430 of the second brewing cup tube 424 via the apertures 431 provided.

The brewing cup 412 and the brewing cup receptacle are preferably made of a tough transparent material such as heat resistant glass. The base 413 of the brewing cup 412 is preferably made of metal so it holds the heat between brewings.

The operation of the third preferred embodiment of the invention will now be described.

A clean brewing cup 412 is placed on the brewing assembly platform 342 within the brewing cup receptacle 406. Tea leaves are loaded and dosed into the brewing cup using a spoon or some other suitable dosing means. The leaves cannot pass through the filter member 418.

The user or operator depresses the button 357 adjacent the relevant brewing assembly 403 to activate the brewing process.

Water that has reached a suitable temperature for brewing is pumped into the brewing cup 412 via the water supply tube 322. The inlet valve 48 controls the volume supplied. The rinse water outlet valve 72 is already closed and thus the level of hot water will simply rise in the brewing cup.

The tea leaves infuse as the volume of water increases in the brewing cup. The filling action causes the tea leaves to swirl in the brewing cup. The heating plates 348, that are also activated when the button 357 is depressed, create convention currents or eddies in the water to facilitate the swirling infusion of the tea leaves.

The inlet valve 28 is programmed to allow the water level to rise just short of the apertures 431 in the dismal end of the second portion 430 of the second brewing cup tube 424. The tea leaves are left to infuse in that volume of water or a predetermined optimum brewing time. That time might be varied to accommodate different blends of tea.

Once the tea has brewed, the inlet valve 28 is programmed to open to pump a predetermined volume of additional hot water into tne brewing cup. The water level shortly rises above the apertures 431. When that occurs the infused tea liquor in the brewing cup will begin to be siphoned into the filter member 418 via the slots 475, upward between the interior surface of the filter member 418 and the exterior surface of the second portion 430 of the second brewing cup tube 424, through the apertures 431 into the second brewing cup tube 424, down the siphon tube 57 and out of the nozzle 36 into a serving receptacle 111 that has been placed on the drip plate 114 thereunder.

Once the liquid contents of the brewing cup 412 has been removed the brewing cup can be removed from the brewing cup receptacle 406 and the spent leaves 108 discarded.

The used brewing cup can be rinsed clean or replaced by an unused brewing cup and the process repeated.

The foregoing description describes a tea brewing apparatus and three preferred embodiments thereof. All three preferred embodiments take the form of counter fitted brewing equipment. The apparatus can however be adapted for installation in other retail settings such as kiosks and mobile vending stations including carts. One skilled in art would appreciate that the apparatus can be modified in many ways without departing from the word or spirit of the invention. Such modifications will be included with the purview of this invention.

What is claimed is:

1. A tea brewing machine comprising a housing and at least one brewing assembly;

said brewing assembly including a brewing cup and means for heating the contents of said brewing cup;

said brewing cup including a filter that defines and separates a first cavity within said brewing cup for containing tea leaves and a second cavity within said brewing cup from which tea leaves are excluded;

said housing has water supply means for supplying a predetermined volume of water at a temperature that is suitable for infusing tea leaves, a water supply channel for delivering said water into said first cavity of said brewing cup, and a siphon tube that has a siphoning end that extends orthogonally upward into said second cavity of said brewing cup and a downward projecting dispensing end;

the arrangement being such that said tea leaves infuse as said water is supplied into said first cavity of said brewing cup, but once the level of infused tea liquor in the second cavity of said brewing cup rises above the siphoning end of the siphon tube said tea liquor siphons down the siphon tube and is dispensed from the dispensing end of the siphon tube.

2. A tea brewing apparatus according to claim 1 wherein the filter is a porous floor within said brewing cup.

3. A tea brewing apparatus according to claim 1 wherein the filter is a detachable body that fits over the siphoning end of the siphon tube.

4. A tea brewing apparatus according to claim 3 wherein the filter is a tubular body that is closed at one end and fits over the siphoning end of the siphon tube.

5. A brewing apparatus according to claim 4 wherein only a portion of the surface area of the tubular body is capable of filtering tea leaves.

6. A tea brewing apparatus according to claim 1 wherein said water supply means supplies a selection of predetermined volumes of water to accommodate different serving sizes.

7. A tea brewing apparatus according to claim 1 wherein a rinse water channel extends from the brewing assembly to an outlet from the housing and operably communicates with said water supply channel to rinse the brewing cup between brews.

8. A tea brewing apparatus according to claim 1 that has a plurality of mutually independent brewing assemblies.

* * * * *